(12) United States Patent
Lee et al.

(10) Patent No.: US 10,506,290 B2
(45) Date of Patent: Dec. 10, 2019

(54) IMAGE INFORMATION PROJECTION DEVICE AND PROJECTION DEVICE CONTROL METHOD

(71) Applicant: LG ELECTRONICS INC., Seoul (KR)

(72) Inventors: Sangmin Lee, Seoul (KR); Jungbin Yim, Seoul (KR); Dongkyu Lee, Seoul (KR); Jungho Yeom, Seoul (KR); Jina Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 348 days.

(21) Appl. No.: 15/512,743

(22) PCT Filed: Sep. 25, 2014

(86) PCT No.: PCT/KR2014/008964
§ 371 (c)(1),
(2) Date: Mar. 20, 2017

(87) PCT Pub. No.: WO2016/047824
PCT Pub. Date: Mar. 31, 2016

(65) Prior Publication Data
US 2017/0295406 A1 Oct. 12, 2017

(51) Int. Cl.
*H04N 21/472* (2011.01)
*H04N 21/81* (2011.01)
(Continued)

(52) U.S. Cl.
CPC ....... *H04N 21/47217* (2013.01); *G03B 21/26* (2013.01); *G03B 21/30* (2013.01);
(Continued)

(58) Field of Classification Search
CPC ........ G03B 21/26; G03B 21/30; G03B 21/53; H04N 21/47217; H04N 21/482; H04N 21/8133; H04N 5/45; H04N 2005/4425
See application file for complete search history.

(56) References Cited

U.S. PATENT DOCUMENTS

2010/0099464 A1* 4/2010 Kim .................. G06F 1/1615
455/566
2013/0162814 A1* 6/2013 Shin ..................... H04N 7/18
348/135
(Continued)

FOREIGN PATENT DOCUMENTS

JP 2014-106951 A 6/2014
KR 10-2011-0101328 A 9/2011
(Continued)

*Primary Examiner* — Tan H Tran
(74) *Attorney, Agent, or Firm* — Birch, Stewart, Kolasch & Birch, LLP

(57) ABSTRACT

The present invention relates to a device for projecting image information and a control method for the device, the device comprising: a main body; a projection unit for projecting image information onto at least two screens having different separation distances from the main body; a detection unit for detecting separation distances between each of the at least two screens and the main body; and a control unit for controlling the projection unit such that different pieces of image information are projected onto the screens on the basis of the separation distances between the main body and the screens, wherein the control unit projects image information corresponding to content selected by a user onto a first screen among the screens and projects image information related to the content onto a second screen.

18 Claims, 13 Drawing Sheets

(51) Int. Cl.
  *G03B 21/30*   (2006.01)
  *H04N 5/45*    (2011.01)
  *H04N 21/482*  (2011.01)
  *G03B 21/26*   (2006.01)
  *G03B 21/53*   (2006.01)
  *H04N 5/44*    (2011.01)

(52) U.S. Cl.
  CPC ............ *H04N 5/45* (2013.01); *H04N 21/482* (2013.01); *H04N 21/8133* (2013.01); *G03B 21/53* (2013.01); *H04N 2005/4425* (2013.01)

(56) References Cited

U.S. PATENT DOCUMENTS

2014/0036235 A1* 2/2014 Chang ................ G03B 21/2053
  353/31
2014/0068520 A1* 3/2014 Missig ................ G06F 3/0482
  715/841
2015/0304615 A1* 10/2015 Hiroi ..................... G03B 21/10
  348/744

FOREIGN PATENT DOCUMENTS

| KR | 10-2013-0074565 A | 7/2013 |
| KR | 10-2014-0037433 A | 3/2014 |
| KR | 10-2014-0110237 A | 9/2014 |

\* cited by examiner

FIG. 5
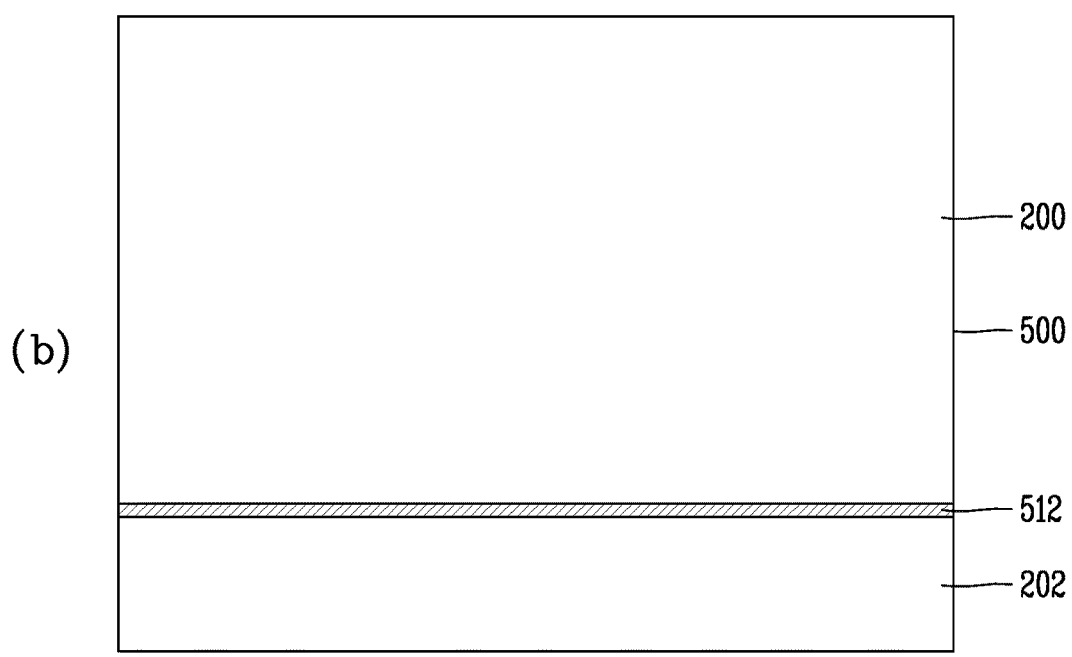

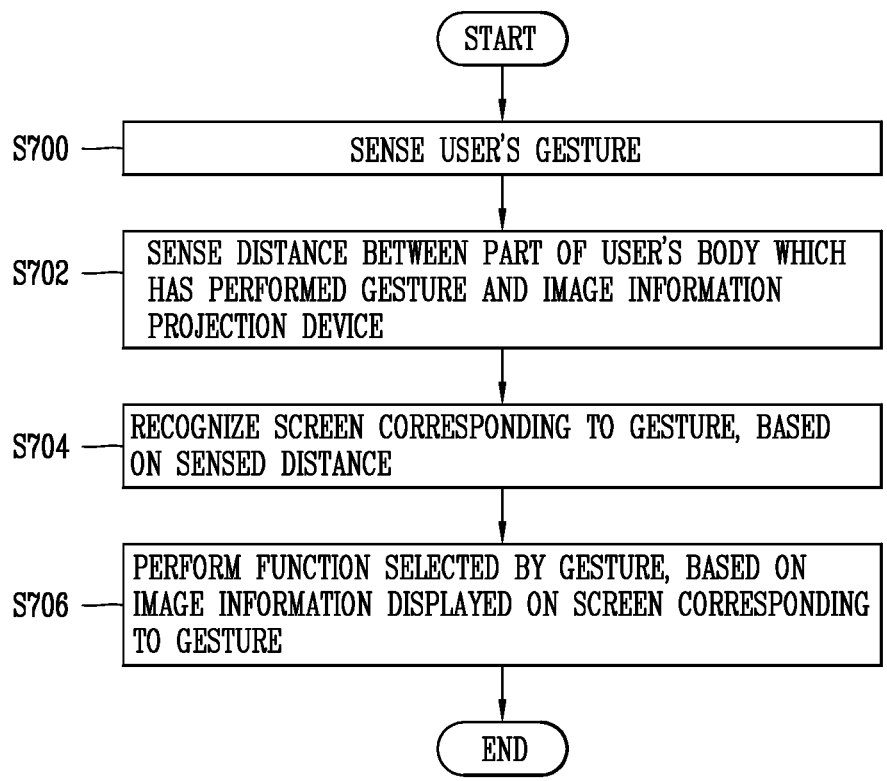

IMAGE INFORMATION PROJECTION DEVICE AND PROJECTION DEVICE CONTROL METHOD

CROSS REFERENCE TO RELATED APPLICATIONS:

This application is the National Phase of PCT International Application No. PCT/KR2014/008964, filed on Sep. 25, 2014, all of which are hereby expressly incorporated by reference into the present application.

TECHNICAL FIELD

The present invention relates to an image information projection device, and a method for controlling the same.

BACKGROUND ART

Nowadays, a projecting device (projector) is used for various purposes. For instance, the projecting device may be connected to a PC or a smart phone, etc. to project image information such as videos or still images stored in the PC or the smart phone, onto a preset screen. As the image information is displayed on a larger screen, the image information stored in the PC or the smart phone may be viewable by a larger number of users.

As the projection device is connected to a smart phone, etc. to project image information stored in the smart phone, it is possible to satisfy a user's desire to enjoy information stored in his or her mobile device with other users. However, when connecting the projection device to such a smart phone, user's personal information stored in the smart phone may be projected onto the screen. This may cause information to be exposed to other users against the user's will.

Further, the projection device serves to project pre-stored image information onto a single screen. This may cause the single screen not to be efficiently used, even if it is much larger than a TV or a PC monitor. Accordingly, research is being actively ongoing in order to solve such problems.

DISCLOSURE OF THE INVENTION

Therefore, an object of the present invention is to provide an image information projection device capable of projecting image information and capable of allowing only user's desired image information to be exposed to other users, and a method for controlling the same.

Another object of the present invention is to provide an image information projection device capable of more efficiently utilizing image information projected through a projector, according to a user's purpose, and a method for controlling the same.

To achieve these and other advantages and in accordance with the purpose of the present invention, as embodied and broadly described herein, there is provided an image information projection device, including: a main body; a projection unit configured to project image information onto at least two screens having different separation distances from the main body; a sensing unit configured to sense separation distances between the at least two screens and the main body; and a controller configured to control the projection unit such that different image information is projected onto the screens, based on the separation distances between the at least two screens and the main body, wherein the controller projects image information corresponding to content selected by a user onto a first screen among the screens, and projects image information related to the content onto a second screen.

In an embodiment, the controller may sort the screens into the first screen and the second screen, based on at least one of the separation distances and image information display areas on the screens.

In an embodiment, the controller may determine the image information display areas on the screens, based on points where the separation distances are changed on image information display regions on the screens, and may determine a screen having a largest image information display area as a result of the determination, as the first screen.

In an embodiment, the controller may control focal distances of the image information displayed on the screens, based on the separation distances between the screens and the main body.

In an embodiment, the controller may differently set resolutions of the screens.

In an embodiment, the controller may determine the resolutions of the screens, based on the separation distances between the screens and the main body.

In an embodiment, if the second screen has a position change, the controller may sense the changed position of the second screen, and may display the image information related to the content, on the position-changed second screen.

In an embodiment, the controller may display image information different from that before the second screen has the position change, based on a distance between the position-changed second screen and the main body.

In an embodiment, the controller may sense a user's gesture from a motion of a part of the user's body, and may recognize the sensed gesture as a user's input with respect to image information projected onto one of the screens, based on a distance between the part of the user's body and the main body.

In an embodiment, the controller may recognize only a user's gesture with respect to a specific screen as the user's input, based on image information displayed on the screens.

In an embodiment, if an object is sensed between the screens and the main body, the controller may recognize the object as a new screen, based on a sensing time of the object.

In an embodiment, if a position and a state of the object are fixed for more than a predetermined time, the controller may recognize the object as a new screen.

In an embodiment, if the object is recognized as a new screen, the controller may project, onto the new screen, image information different from that projected onto the first and second screens.

In an embodiment, the image information projected onto the new screen may be related to the content having not projected onto the second screen.

In an embodiment, the sensing unit may sense the separation distances between the at least two screens and the main body, using at least one of an infrared ray sensor, an ultrasonic sensor, a laser sensor and a light sensor.

In an embodiment, the screens may be arranged in at least two, in parallel in a horizontal direction or in a vertical direction.

In an embodiment, the image information projected onto the second screen may include at least one of a control menu of an application which plays the content projected onto the first screen, and additional information related to the content.

In an embodiment, when the image information projection device is connected to a personal computer (PC) body or a smart phone, the controller may perform a dual monitor function by recognizing the first and second screens as different monitors, based on the separation distances.

In an embodiment, the image information projection device may be mounted to a head mounted display (HMD) device or a mobile terminal.

To achieve these and other advantages and in accordance with the purpose of the present invention, as embodied and broadly described herein, there is also provided a method for controlling an image information projection device, the method including: sensing separation distances between a main body of the image information projection device and at least two screens having different separation distances from the main body; sorting the screens into a screen onto which image information corresponding to content selected by a user is projected, and a screen onto which image information related to the content is projected; and projecting the image information corresponding to the content, and the image information related to the content, onto the sorted screens.

Advantageous Effects

The image information projection device and the method for controlling the same according to the present invention may have the following advantages.

According to at least one of preferred embodiments, image information that a user wishes to view together with other users, and image information that the user does not wish to view together with other users, may be distinguished from each other, by using at least two screens. This may allow information that the user does not wish to reveal, not to be exposed to other users.

According to at least one of preferred embodiments, since different image information is displayed on each of at least two screens according to a user's purpose, the screens may be used more efficiently.

BRIEF DESCRIPTION OF THE DRAWINGS

FIG. 5 is a conceptual view illustrating a process of estimating an image information display ratio on each screen by an image information projection device according to an embodiment of the present invention;

FIG. 7 is a flowchart illustrating an operation to perform a specific function based on a sensed user's gesture, by an image information projection device according to an embodiment of the present invention;

MODES FOR CARRYING OUT THE PREFERRED EMBODIMENTS

Technical terms used in this specification are merely intended for easy description of specific embodiments, and they do not limit the present invention. A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

In describing the present invention, if a detailed explanation for a related known function or construction is considered to unnecessarily divert the gist of the present disclosure, such explanation has been omitted but would be understood by those skilled in the art.

Hereinafter, embodiments disclosed in this specification will be explained in more detail with reference to the attached drawings. An image information projection device used in this specification means a device which projects a pre-stored image or image information such as videos, onto a preset screen, using a lens and an optical source. The image information projection device may include a portable image device such as a pico-projector which projects content desired to be viewed onto a beam project screen, in a connected state to various devices including a mobile device such as a smart phone, a tablet PC or a notebook.

Hereinafter, embodiments disclosed in this specification will be explained in more detail with reference to the attached drawings.

For a complete understanding of the present invention, a basic principle of the present invention will be explained. In the present invention, different image information is displayed on each of a plurality of screens having different separation distances from a main body of the image information projection device according to an embodiment of the present invention. The image information projection device according to an embodiment of the present invention may display different image information on the screens, based on separation distances between the screens and the main body, such that a user may use the screens as different screens.

Figure 1:
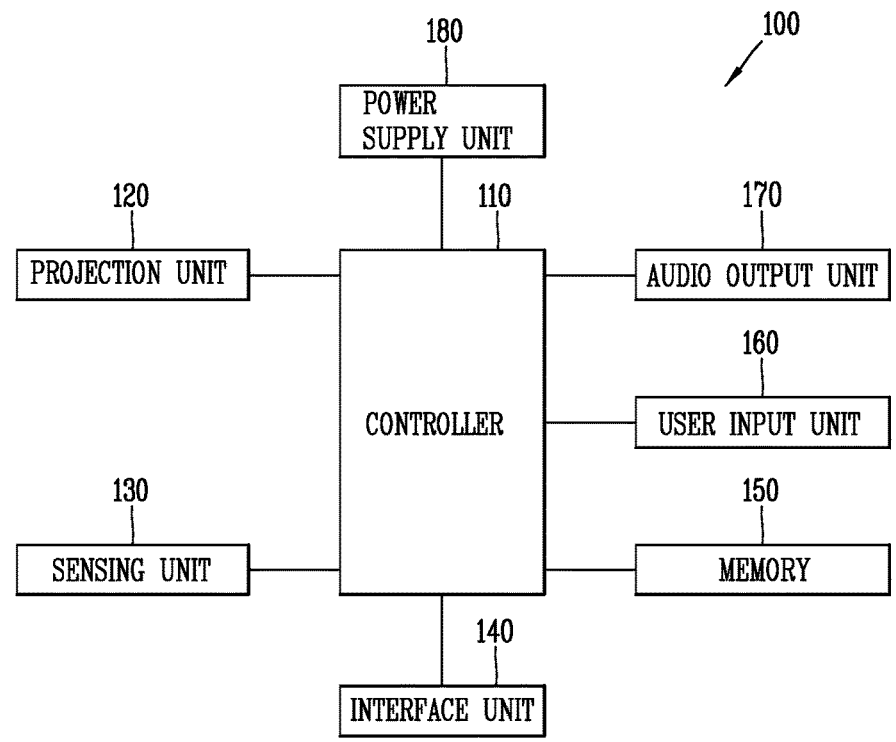
FIG. 1 is a block diagram illustrating a configuration of an image information projection device according to an embodiment of the present invention.

FIG. 1 is a block diagram illustrating a configuration of the image information projection device according to an embodiment of the present invention.

Referring to FIG. 1, the image information projection device 100 according to an embodiment of the present invention may include a controller 110, a projection unit 120, a sensing unit 130 and a memory 150, each connected to the controller 110. The image information projection device 100 according to an embodiment of the present invention may further include an interface unit 140, a power supply unit 180, a user input unit 160 and an audio output unit 170, each connected to the controller 110.

The sensing unit 130 may include various types of sensors for sensing a distance between objects which are positioned around the main body of the image information projection device 100. For instance, the sensing unit 130 may include at least one of an infrared ray (IR) sensor, an ultrasonic sensor, a laser sensor, and an optical sensor or a photo sensor (e.g., a camera). And the sensing unit 130 may utilize information sensed by at least one of the sensors, in a combined manner.

The ultrasonic sensor may be implemented to recognize position information relating to a touch object using ultrasonic waves. The controller 110, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

Implementing the illumination sensor with a laser sensor may allow detection of a touch of a physical object with respect to a 3D stereoscopic image. A photo sensor may be laminated on, or overlapped with, a display device. The photo sensor may be configured to scan movement of the physical object in proximity to a touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

Further, the sensing unit 130 may sense a movement of a part of a user's body, using the above sensors. And the sensing unit 130 may sense a distance between the main body of the image information projection device 100 according to an embodiment of the present invention and the sensed part of the user's body.

The sensing unit 130 senses a distance between the main body and an object or a part of a user's body positioned near the main body of the image information projection device 100 (environment information around the image information projection device 100), and/or senses a gesture by the part of the user's body, thereby generating a corresponding sensing signal. The controller 110 may control a driving or an operation of the image information projection device 100 based on such a sensing signal, or may perform a data processing, a function or an operation related to an application program installed to the image information projection device 100.

The projection unit 120 includes an optical source and a lens, and may project image information onto at least one preset screen under control of the controller 110. In this case, if a distance between the screen and the main body of the image information projection device 100 is long, the image information may be projected onto the screen in an enlarged manner. Here, the projection unit 120 may control a focal distance of the image information according to the distance between the screen and the main body. And the projection unit 120 may control a resolution of the image information displayed on the screen, within an allowable range, under control of the controller 110.

The projection unit 120 may be implemented as a plurality of lenses arranged in a plurality of lines. In this case, the projection unit 120 may project image information corresponding to a different focal distance, through each of the plurality of lenses.

The memory 150 is typically implemented to store data to support various functions of the image information projection device 100. For instance, the memory 150 may be configured to store data related to image information to be projected (e.g., still images, moving images, etc.). Further, the memory 150 may store application programs (applications) executed in the image information projection device 100, data or instructions for operations of the image information projection device 100, and the like. Some of these application programs may be downloaded from an external server via wireless communication. Other application programs may be installed within the image information projection device 100 at time of manufacturing or shipping, which is typically the case for basic functions of the image information projection device 100 (for example, a function to control a size, a resolution, a focal distance, etc. of image information to be projected). It is common for application programs to be stored in the memory 150, installed in the image information projection device 100, and executed by the controller 110 to perform an operation (or function) for the image information projection device 100.

The memory 150 may include one or more types of storage mediums including a Flash memory, a hard disk, a card-type memory (e.g., SD or DX memory, etc), etc. The image information projection device 100 may also be operated in relation to a web storage that performs a storage function of the memory 150 over a network, such as the Internet.

The controller 110 typically functions to control an overall operation of the image information projection device 100, in addition to the operations associated with the application programs. The controller 110 may project pre-stored image information, or may provide functions appropriate for a user with respect to projected image information, by processing signals, data, information and the like, which are input or output by the aforementioned various components, or activating application programs stored in the memory 150.

The controller 110 may recognize a plurality of screens onto which image information is to be projected, and may sense distances between the screens and the main body, through the sensing unit 130. And the controller 110 may control the projection unit 120 to project different image information onto the screens, based on the sensed distances between the screens and the main body of the image information projection device 100.

For instance, the controller 110 may sort the recognized screens, based on a preset condition, into a screen onto which content selected by a user is to be projected (hereinafter, will be referred to as 'first screen') and a screen onto which other image information related to the content is to be projected (hereinafter, will be referred to as 'second screen'). The controller 110 may distinguish the first and second screens from each other, based on a ratio of image information display areas on the screens. In this case, the controller 110 may set one screen having a larger image information display area as the first screen, and may project other image information related to the content onto another screen (second screen).

The controller 110 may determine image information which is to be projected onto the second screen, based on a separation distance between the second screen and the main body of the image information projection device 100. For instance, if the separation distance between the second screen and the main body is more than a preset level, the controller 110 may project information related to an operation state of content being projected onto the first screen.

On the other hand, if the separation distance between the second screen and the main body is less than a preset level, the controller 110 may project information related to the content but not wanted to be exposed to other persons by a user (e.g., information on other contents stored in a storage unit where the content has been stored, e.g., the memory 150 or a preset web storage).

Further, if a movement of a part of a user's body is sensed by the sensing unit 130, the controller 110 may recognize the movement as a gesture of the user. In this case, the controller 110 may control a different control to be performed with respect to image information being displayed on the screens, based on a separation distance between the part of the user's body and the main body of the image information projection device 100. That is, the controller 110 may recognize the sensed gesture as a gesture with respect to a screen closest to the separation distance between the part of the user's body and the main body, among the screens. And the controller 110 may execute a function corresponding to the image information displayed on the screen, and corresponding to the sensed gesture. Accordingly, when users' different gestures with respect to screens having different separation distances from the main body are sensed, the controller 110 may control functions corresponding to the gestures to be performed.

The interface unit 140 serves as an interface with various types of external devices that can be coupled to the image information projection device 100. The interface unit 140 may receive data from an external device, or may receive power to transmit the power to each component inside the image information projection device 100, or may transmit data inside the image information projection device 100 to the external device. For example, the interface unit 140 may include any of wired or wireless headset ports, external power supply ports, wired or wireless data ports, memory card ports, audio input/output (I/O) ports, video I/O ports and earphone ports. In some cases, the image information projection device 100 may perform assorted control functions associated with a connected external device, in response to the external device being connected to the interface unit 140.

The user input unit 160 is a component that permits input by a user. Such user input may enable the controller 110 to control operation of the image information projection device 100. The user input unit 160 may include one or more of a mechanical input element (for example, a mechanical key, a button located on a front and/or rear surface or a side surface of the image information projection device 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the flexible glass display apparatus at a location that is other than the touch screen. On the other hand, the virtual key or the visual key may be displayed on the touch screen in various shapes, for example, graphic, text, icon, video, or a combination thereof.

The audio output unit 170 may output audio data related to image information being projected onto screens, under control of the controller 110. The audio output unit 170 may include a connection port which is connectable to an audio output device, e.g., a speaker. The audio output unit 170 may output audio data transmitted through the connection port, through the audio output device, with a volume level controlled by the controller 110.

The power supply unit 180 receives external power or provides internal power and supply the appropriate power required for operating respective elements and components included in the image information projection device 100, under control of the controller 110. The power supply unit 180 may include a battery, which is typically rechargeable or be detachably coupled to the main body of the image information projection device 100 for charging. The power supply unit 180 may include a connection port. The connection port may be configured as one example of the interface unit 140 to which an external charger for supplying power to recharge the battery is electrically connected.

As another example, the power supply unit 180 may be configured to recharge the battery in a wireless manner without use of the connection port. In this example, the power supply unit 180 can receive power, transferred from an external wireless power transmitter, using at least one of an inductive coupling method which is based on magnetic induction or a magnetic resonance coupling method which is based on electromagnetic resonance.

Although not shown, the image information projection device 100 according to an embodiment of the present invention may further include a communication module for communications between the image information projection device and an external device or a preset external server. For example, the communication module may support wireless communications between the image information projection device 100 and a wireless communication system, communications between the image information projection device 100 and another mobile terminal, via Bluetooth, wireless-fidelity (Wi-Fi), infrared ray communication, near field communication (NFC), etc. One example of the short-range wireless area networks is a wireless personal area networks.

Here, said another mobile terminal may be a wearable device which is able to exchange data with the image information projection device 100, e.g., a smart watch, a smart glass or a head mounted display (HMD).

At least some of the above components may operate in a cooperating manner, so as to implement an operation or a control method of the image information projection device 100 according to various embodiments to be explained later. The operation or the control method of the image information projection device 100 may be implemented on the image information projection device by driving at least one application program stored in the memory 150.

Various embodiments described herein may be implemented in a computer-readable medium, a machine-readable medium, or similar medium using, for example, software, hardware, or any combination thereof.

Embodiments related to a control method which can be implemented in the image information projection device will be explained with reference to the attached drawings. It is obvious to those skilled in the art that the present invention may be embodied in several forms without departing from the spirit and the characteristics thereof.

Figure 2:
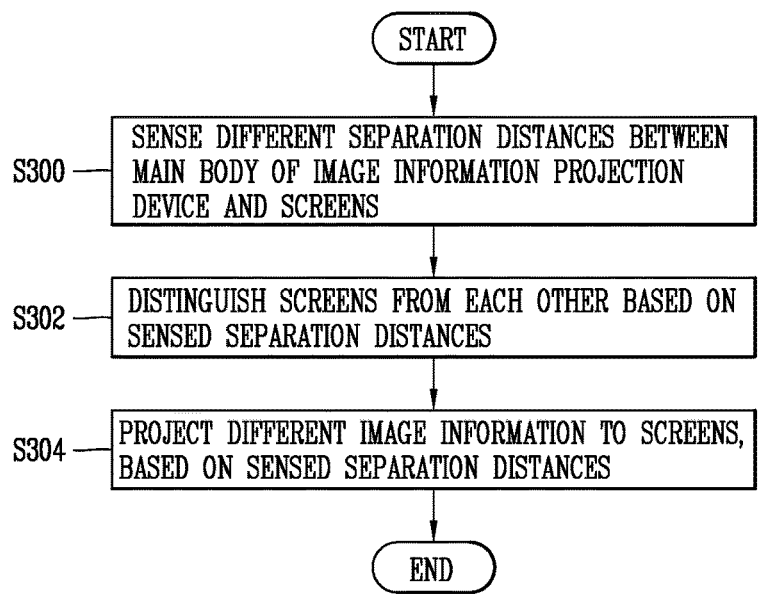
FIG. 2 is a flowchart illustrating an operation of an image information projection device according to an embodiment of the present invention.
Figure 3:
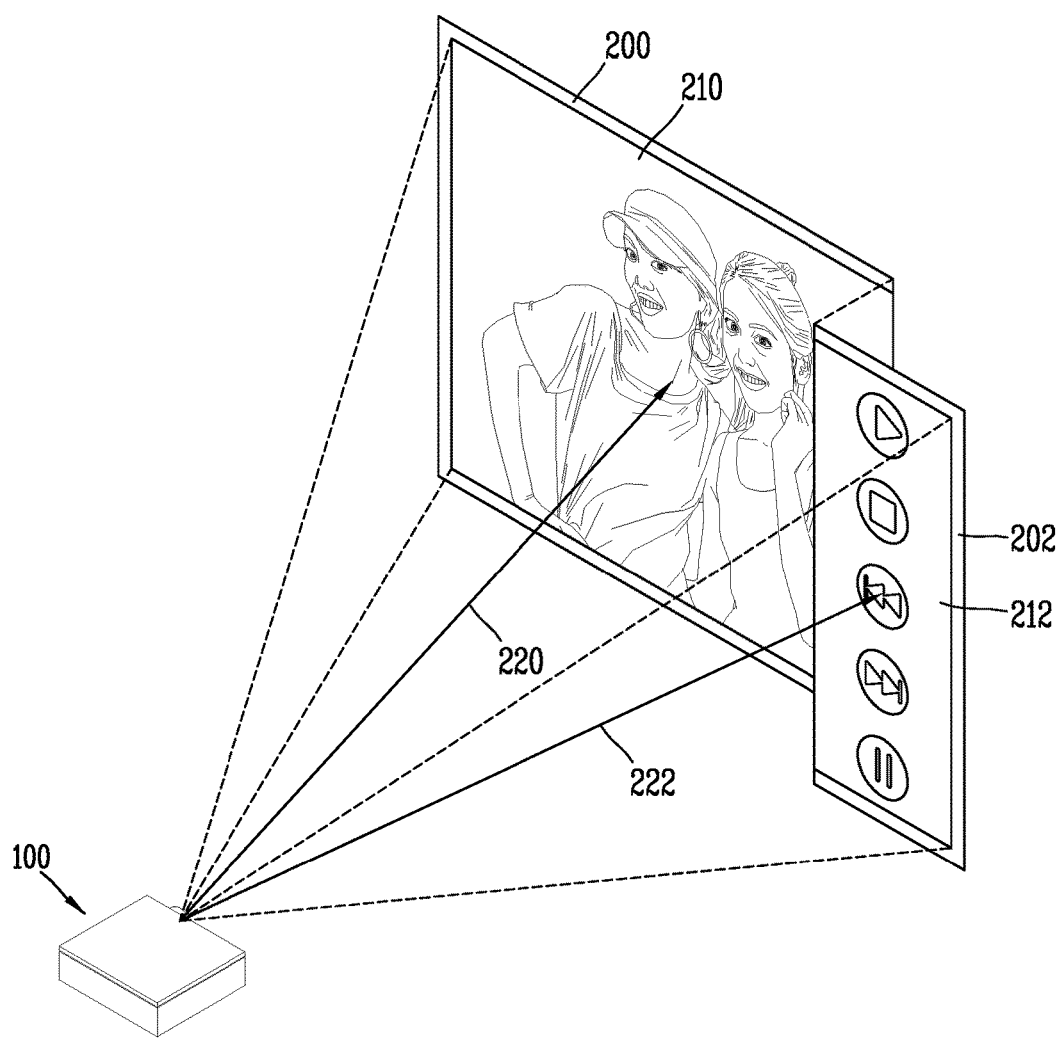
FIG. 3 is a view illustrating an example to project image information onto a plurality of screens by an image information projection device according to an embodiment of the present invention.

FIG. 2 is a flowchart illustrating an operation of the image information projection device according to an embodiment of the present invention, and FIG. 3 is a view illustrating an example to project image information onto a plurality of screens by the image information projection device according to an embodiment of the present invention.

Referring to FIG. 2, the image information projection device according to an embodiment of the present invention senses separation distances between the image information projection device 100 and screens positioned near the image information projection device 100 (S300). For instance, the sensing unit 130 may be disposed on a surface of the image information projection device where a light source and a lens are provided, and may sense objects which are disposed in a direction to project image information (hereinafter, will be referred to as a front side of the image information projection device). The objects may be screens where image information can be projected.

The controller 110 may recognize the objects as screens based on a preset condition. For instance, the controller 110 may sense whether the objects have moved or not. And if a fixed state of the object is maintained for more than a predetermined time, the controller 110 may recognize the object as a screen where image information is to be projected. The screen may be one or more. If there are a plurality of screens, separation distances between the image information projection device and the plurality of screens may be different from each other. In this case, the controller 110 may sense the separation distances between the image information projection device and the plurality of screens.

Once the separation distances between the image information projection device and the plurality of screens are sensed, the controller 110 may distinguish the screens from each other (S302). S302 is for displaying different image information on each of the screens, and for determining a screen where content is to be projected, and a screen where information about the content is to be projected, according to a user's selection. For instance, the controller 110 may control content to be projected onto a screen having a larger image information display ratio (i.e., a larger image information display area), and may control information about the content to be projected onto a screen having a smaller image information display area, among the currently sensed screens. The operation to distinguish the sensed screens from each other based on a display area of image information will be explained in more detail with reference to FIG. 4.

In S302, if the screens are distinguished from each other, the controller 110 may project different image information onto the screens (e.g., the first and second screens) (S304). In this case, the controller 110 may determine image information to be projected onto the screens, based on the sensed separation distances. The controller 110 may control image information corresponding to content selected by a user, to be displayed on the first screen, and may control information about the content displayed on the first screen, to be displayed on the second screen.

The information about the content may be variable. For instance, the information may be a control menu screen for controlling play of image information displayed on the first screen, or may be information about content projected onto the first screen. For instance, when the content is a film, the information may be information about a hero, a synopsis, or a genre of the film. Alternatively, the information may be information about a storage unit where content projected onto the first screen has been stored.

FIG. 3 is a view illustrating an example to display different image information onto a plurality of screens having different separation distances from the main body of the image information projection device 100.

Referring to FIG. 3, the controller 110 of the image information projection device 100 may sense two screens 200, 202 based on a sensing result by the sensing unit 130. In this case, the controller 110 may recognize the two screens as a first screen 200 and a second screen 202, in a differentiated manner.

Then, the controller 110 may project different image information onto each of the screens (S304). That is, the controller 110 may project image information corresponding to content selected by a user, onto the first screen 200. And the controller 110 may project, onto the second screen 202, image information related to a control menu which can control an operation state of the content projected onto the first screen 200. FIG. 3 illustrates an example of such a case.

As shown in FIG. 3, in case of displaying image information on the different screens, the controller 110 may control image information to be displayed on each of the screens, according to different resolutions and/or focal distances, based on a distance between the first screen 200 and the image information projection device 100, and based on a distance between the second screen 202 and the image information projection device 100.

For instance, the projection unit 120 of the image information projection device 100 may be implemented in the form of a plurality of lenses arranged along a plurality of lines, thereby projecting image information according to a different focal distance through each of the plurality of lenses. In this case, the controller 110 may project image information according to a different focal distance of each of the plurality of lenses. Therefore, the image information projection device 100 according to an embodiment of the present invention may project image information on the first screen 200 and the second screen 202, based on a focal distance corresponding to a separation distance (first separation distance 220) between the first screen 200 and the image information projection device 100, and based on a focal distance corresponding to a separation distance (second separation distance 222) between the second screen 202 and the image information projection device 100, respectively.

With such a configuration, the controller 110 of the image information projection device 100 according to an embodiment of the present invention may project image information having a corresponding focal distance, onto each of the screens (the first screen 200, the second screen 202) having different separation distances. Further, the controller 110 may set a different resolution to each of the first screen 200 and the second screen 202, such that image information having proper resolutions according to the first separation distance 220 and the second separation distance 222 may be displayed.

If one of the screens 202, 202 has a position change, the controller 110 may control image information to be displayed, to be changed according to the changed position. For instance, if the second screen 202 has a position change such that a distance between the second screen 202 and the image information projection device 100 becomes longer or shorter than the distance shown in FIG. 3, the controller 110 may change image information to be displayed on the second screen 202. As the second screen 202 has the position change, the controller 110 may adjust a focal distance of image information projected onto the second screen 202, and/or change a resolution of image information projected onto the second screen 202.

If a motion of a part of a user's body located between one of the screens and the projection unit 120 is sensed, the controller 110 may recognize the sensed motion as an input of the user with respect to the image information projection device 100. That is, as shown in FIG. 3, in a case where image information corresponding to content selected by a user is displayed on the first screen 200, and in a case where a control menu for controlling a play operation of image information displayed on the first screen 200 is displayed on the second screen 202, the controller 110 may recognize the sensed user's motion (i.e., gesture) as the user's input with respect to the control menu displayed on the second screen 202. In this case, the controller 110 may determine whether to recognize the gesture as the user's input, based on a distance between the part of the user's body which has performed the gesture and the image information projection device 100. In this case, only when the distance between the part of the user's body which has performed the gesture and the second screen 202 is less than a preset value, the controller 110 may recognize the gesture as the user's input.

In the above descriptions, as shown in FIG. 3, the screens are formed in two. However, the present invention is not limited to this. That is, the image information projection device 100 according to an embodiment of the present invention may project image information onto a large number of screens. In this case, image information displayed on the respective screens may be different from each other.

Further, if a new object is sensed while image information is being projected, the image information projection device 100 according to an embodiment of the present invention may recognize the new object as a new screen. In this case, the controller 110 may display image information different from the image information which is being currently displayed on the screens, based on a distance between the new object (new screen) and the image information projection device 100.

The controller 110 of the image information projection device 100 may distinguish a screen (first screen) onto which content selected by a user is to be projected, from a screen (second screen) onto which information related to the content is to be projected, based on a preset condition. In this case, the controller 110 may categorize the screens into the first screen and the second screen, based on distances between the screens and the image information projection device 100.

For instance, the controller 110 may recognize a screen having a longer separation distance as the first screen, and may recognize a screen having a shorter separation distance as the second screen. The reason is as follows. If the screen is farther from the image information projection device 100, image information may be displayed on the screen with a larger size. This may allow a large number of persons to easily share the image information.

However, on the contrary, if the screen is closer to the image information projection device 100, image information may be displayed on the screen with a smaller size. Further, as a distance between the screen and the image information projection device 100 is short, a probability to expose the image information to another person may be low. Thus, the controller 110 of the image information projection device 100 may categorize the screens into a screen (first screen) onto which content selected by a user is to be projected, and a screen (second screen) onto which information related to the content is to be projected, based on separation distances between the screens and the image information projection device 100.

Figure 4:
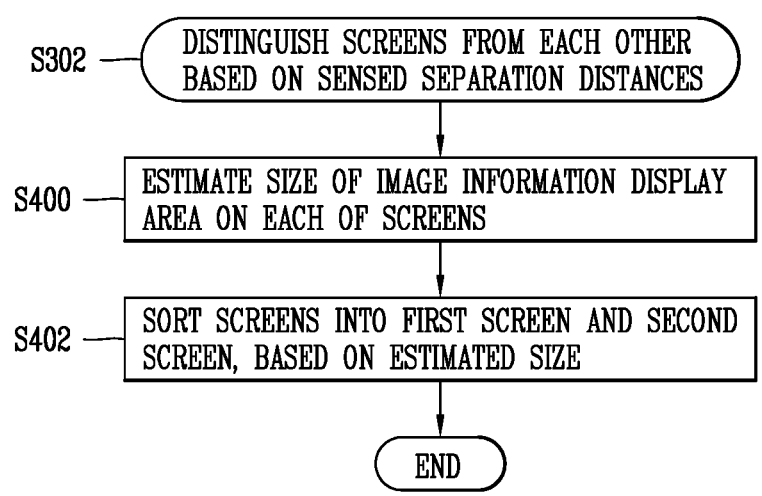
FIG. 4 is a flowchart illustrating an operation to distinguish a plurality of screens from each other, among processes shown in FIG. 3.

Alternatively, the controller 110 may categorize the screens into the first screen and the second screen, based on a size of an area where image information is displayed. FIG. 4 is a flowchart illustrating processes to distinguish the screens from each other in such a case. And FIG. 5 is a conceptual view illustrating a process of estimating a size of an image information display area on each of the screens, according to an image information display ratio, among the processes shown in FIG. 4.

Referring to FIG. 4, the controller 110 of the image information projection device 100 according to an embodiment of the present invention may estimate a size of an image information display area on each of the screens (400). For instance, the controller 110 may determine a size of an image information display region on each of the screens, based on points where the separation distances are changed on the image information display regions. Then, the controller 110 may categorize the screens into a screen (first screen) onto which content selected by a user is to be projected, and a screen (second screen) onto which information related to the content is to be projected, based on the estimated size.

For instance, referring to FIG. 5, FIGS. 5A and 5B illustrate examples of the first screen 200 and the second screen 202. FIG. 5A illustrates that the first screen 200 and the second screen 202 having different separation distances from the image information projection device 100, are arranged in parallel in a longitudinal direction (e.g., FIG. 3). And FIG. 5B illustrates that the first screen 200 and the second screen 202 are arranged in parallel in a horizontal direction. In the following descriptions, it is assumed that a separation distance between the second screen 202 and the image information projection device 100 is shorter than that between the first screen 200 and the image information projection device 100, in FIGS. 5A and 5B.

Referring to FIG. 5A, the controller 110 of the image information projection device 100 according to an embodiment of the present invention may sense a separation distance between the screen 200 and the image information projection device 100, and a separation distance between the screen 202 and the image information projection device 100. In this case, as shown in FIG. 5A, the controller 110 may sense regions corresponding to the first screen 200 and the second screen 202, and may sense a boundary region 510 between the two screens 200, 202.

In this case, a difference of the separation distances between the screens 200, 202 and the image information projection device 100 may occur from the boundary region 510. The controller 110 may detect the boundary region 510 having the difference of the separation distances between the screens 200, 202 and the image information projection device 100, and may detect a region where a larger amount of image information is displayed, between the screens 200, 202. That is, as shown in FIG. 5A, if the boundary region 510 having the difference of the separation distances between the screens 200, 202 and the image information projection device 100 is rightward positioned based on a center of a region where image information is to be displayed, the controller 110 may estimate the screen 200 as a larger image information display region. Thus, the controller 110 may recognize the screen 200 as a first screen onto which image information corresponding to content selected by a user is displayed, and the screen 202 as a second screen onto which information related to the content is displayed.

In a case where the screens 200, 202 are arranged in parallel in a horizontal direction as shown in FIG. 5B, the controller may sort the screens 200, 202 into the first screen and the second screen, based on a region 512 where a difference of separation distances occurs, in the same manner. That is, as shown in FIG. 5B, if the region 512 where a difference of separation distances occurs is downward positioned based on a center of an image information display region, the controller 110 may estimate the screen 200 as a larger image information display region. Thus, the controller 110 may recognize the screen 200 as a first screen onto which image information corresponding to content selected by a user is displayed, and the screen 202 as a second screen onto which information related to the content is displayed.

If a position of the screen is changed, the controller 110 of the image information projection device 100 according to an embodiment of the present invention may control different image information to be projected, based on a distance between the position-changed screen and the image information projection device 100.

Figure 6:
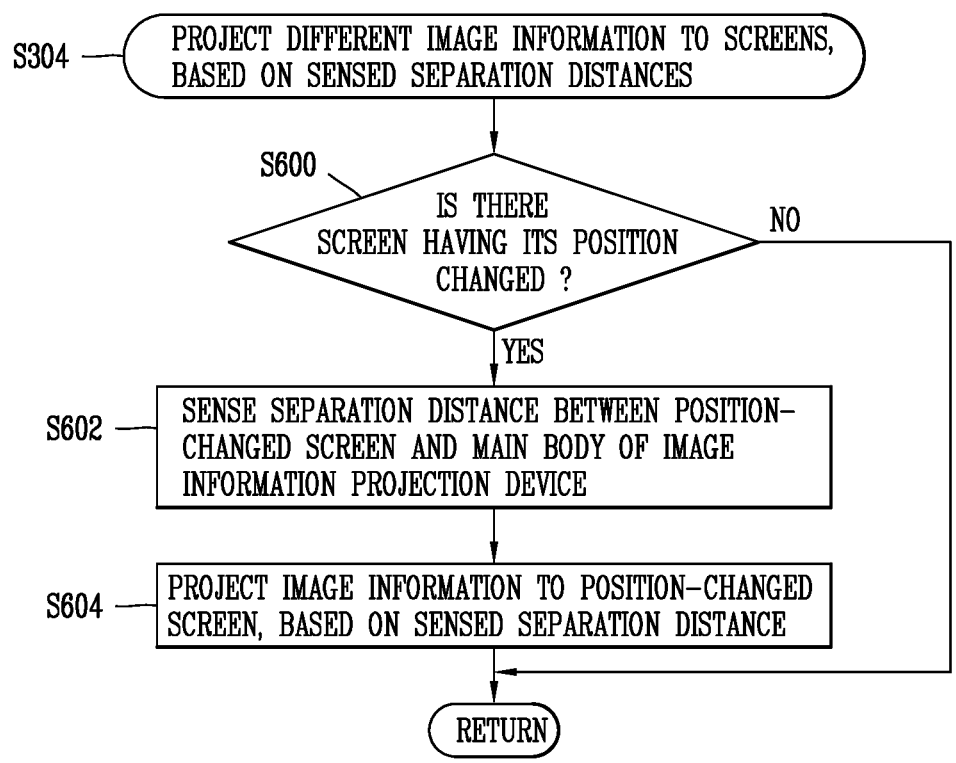
FIG. 6 is a flowchart illustrating an operation to project image information onto a screen having its position changed, by an image information projection device according to an embodiment of the present invention.

FIG. 6 is a flowchart illustrating an operation to project image information onto the position-changed screen in such a case, by the image information projection device according to an embodiment of the present invention.

Referring to FIG. 6, the controller 110 of the image information projection device 100 according to an embodiment of the present invention senses whether there exists a screen having its position changed, in a state where image information is being projected onto each screen based on a separation distance (S600). If there exists a screen having its position changed as a sensing result in S600, the controller 110 may control image information to be continuously output to the position-changed screen. In this case, if the position-changed screen has a position where a separation distance from the main body of the image information projection device 100 has been changed, the controller 110 may change image information to be displayed on the position-changed screen, based on the changed separation distance.

In this case, if there exists a screen having its position changed as a sensing result in S600, the controller 110 senses a separation distance between the position-changed screen and the main body of the image information projection device 100 (S602). Then, the controller 110 may determine image information to be displayed on the position-changed screen based on the sensed separation distance, and may project the determined image information onto the position-changed screen (S604). In the present invention, in a state where image information is being displayed on screens, if one of the screens has a position change, the image information may be continuously displayed on the position-changed screen, and the image information may be changed based on a separation distance between the position-changed screen the image information projection device 100. An example to display image information when one of screens has a position change, will be explained in more detail with reference to FIGS. 8A to 8C.

In the aforementioned descriptions, the image information projection device 100 according to an embodiment of the present invention may sense a movement of a part of a user's body, and may recognize the sensed movement as an input of the user. FIG. 7 is a flowchart illustrating an operation to perform a specific function based on a sensed user's gesture, by the image information projection device according to an embodiment of the present invention.

Referring to FIG. 7, the image information projection device 100 according to an embodiment of the present invention may sense a user's movement, in case of displaying image information on screens. In this case, the user may be positioned between the image information projection device 100 and the screens, and may be two or more.

Here, the controller 110 may sense a gesture by the part of the user's body (S700). Once the gesture is sensed from the user's movement, the controller 110 may recognize an input of the user corresponding to the gesture. In this case, the controller 110 may determine image information to which the sensed gesture corresponds, between the two image information being displayed on the screens. Then, the controller 110 may recognize the gesture as a user's input with respect to the determined image information being displayed on the screen.

In this case, the controller 110 may sense a distance between the part of the the user's body and the image information projection device 100 (S700). The reason is because a screen corresponding to the user's gesture is recognizable based on a separation distance between the part of the user's body which has performed the gesture and the image information projection device 100, and based on separation distances between the screens onto which image information is being projected and the image information projection device 100.

If the separation distance between the part of the user's body which has performed the gesture and the image information projection device 100 is sensed in S702, the controller 110 may recognize a screen corresponding to the gesture, based on the sensed separation distance (S704). For instance, the controller 110 may recognize a screen closest to the separation distance sensed in S702, among the separation distances between the screens and the image information projection device 100, as a screen corresponding to the gesture.

That is, in a case where image information is being projected onto the first and second screens and there are a plurality of users between the screens and the image information projection device 100, if a motion of a part of a user's body positioned between the first screen and the image information projection device 100 is sensed, the controller 110 may recognize the motion as a gesture of the user with respect to the image information being displayed on the first screen. If a motion of a part of a user's body positioned between the second screen and the image information projection device 100 is sensed, the controller 110 may recognize the motion as a gesture of the user with respect to the image information being displayed on the second screen. In this case, if a distance between the part of the user's body and the image information projection device 100 sensed in S702 is different from one of the separation distances between the screens and the image information projection device 100 by more than a preset value, the controller 110 may not recognize the gesture as an input of the user. That is, only when the distance between the part of the user's body and the image information projection device 100 is different from one of the separation distances between the screens and the image information projection device 100 within a preset value, the controller 110 may recognize the user's gesture as an input of the user to one of the screens.

So far, the operation of the image information projection device 100 according to an embodiment of the present invention has been explained through the flowcharts.

Hereinafter, with reference to exemplary views, will be explained an example to display different image information by the image information projection device 100 according to an embodiment of the present invention, based on a separation distance between a screen and the image information projection device 100.

In the above descriptions, it was mentioned that the image information projection device 100 according to an embodiment of the present invention may project different image information onto each of a plurality of screens having different separation distances from the main body of the image information projection device 100. Thus, the image information projection device 100 according to an embodiment of the present invention may display image information having a different user interface, onto each of the plurality of screens. Further, if a screen has a position change, the image information projection device 100 according to an embodiment of the present invention may sense the position change of the screen, based on a change of its separation distance from the position-changed screen. In this case, the controller may control image information to be continuously displayed on the position-changed screen. Alternatively, the controller may control the image information displayed on the position-changed screen, to be changed, based on a separation distance corresponding to the changed position.

Figure 8A:
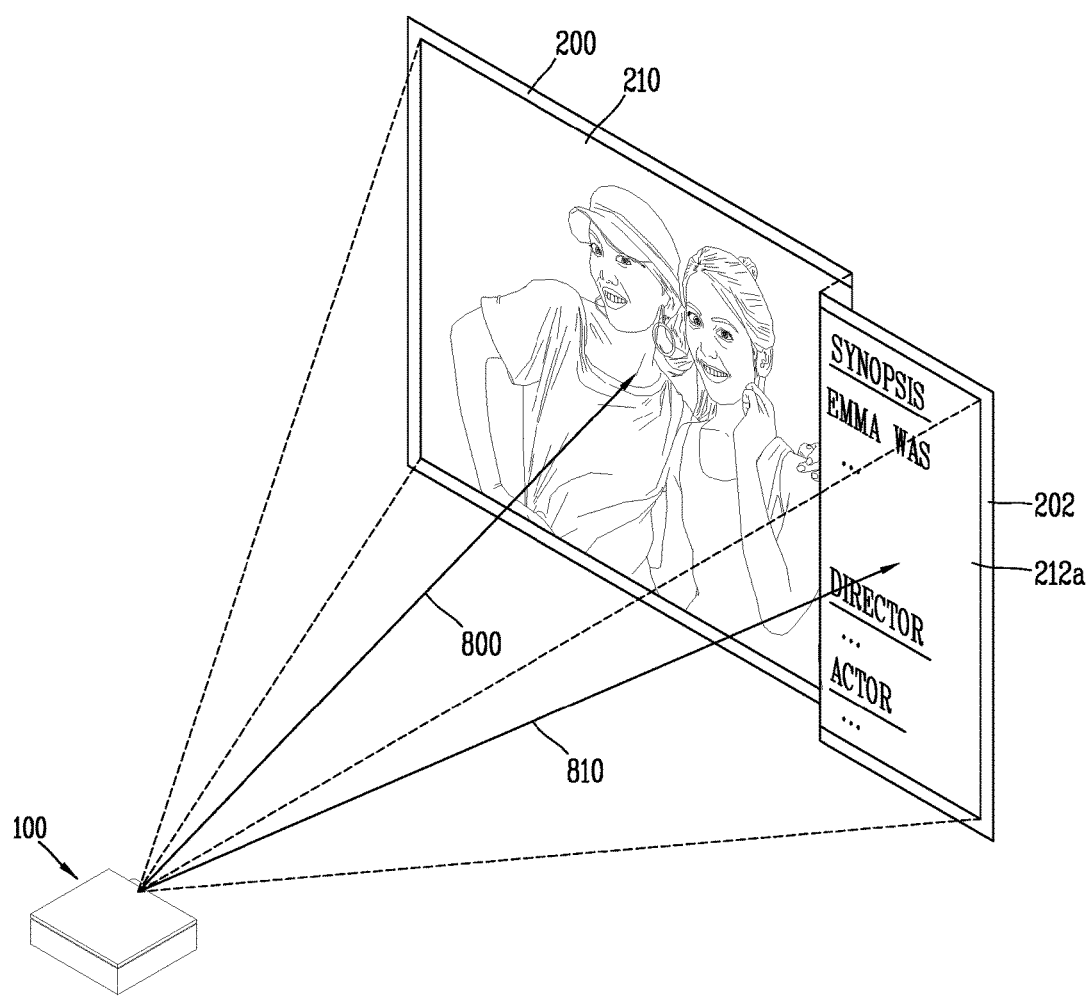
FIGS. 8A to 8C are views illustrating examples to display different image information according to a separation distance between a screen and an image information projection device, by the image information projection device according to an embodiment of the present invention.
Figure 8B:
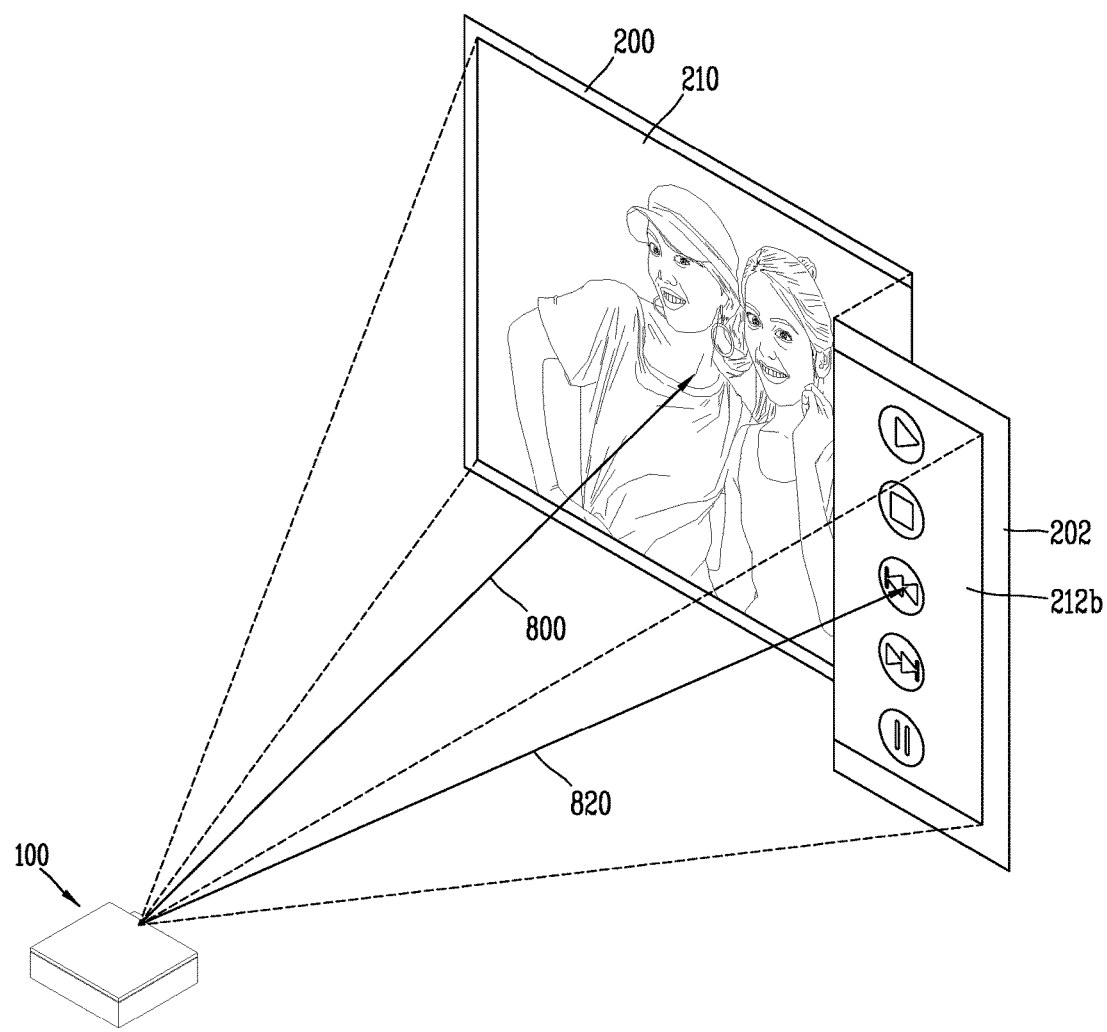
Figure 8C:
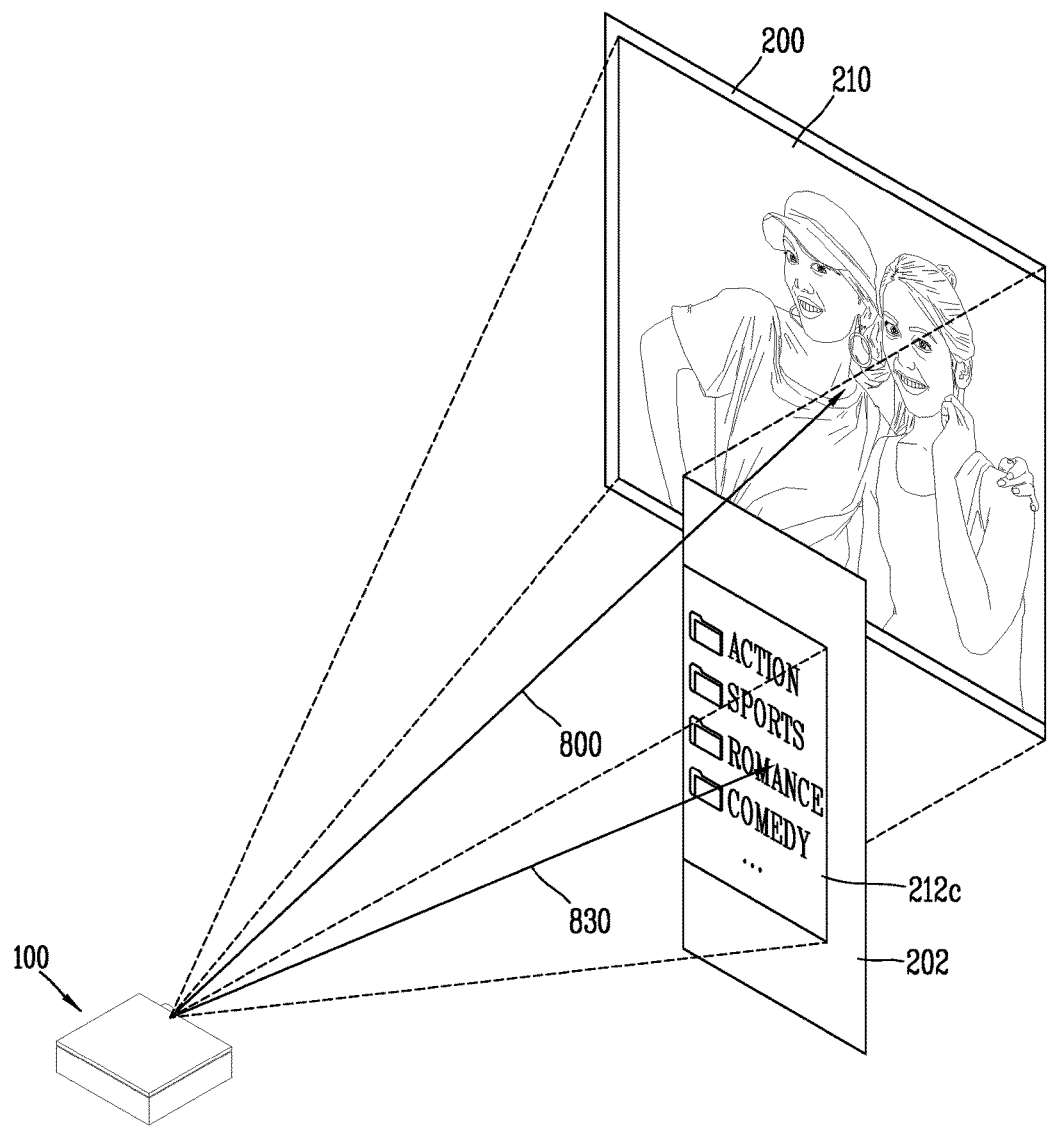

FIGS. 8A to 8C are views illustrating examples to display different image information based on a separation distance between the image information projection device and a screen, by the image information projection device according to an embodiment of the present invention.

FIG. 8A illustrates an example to display image information corresponding to content selected by a user, and image information related to the content, on screens 200, 202, respectively, by the image information projection device according to an embodiment of the present invention.

Referring to FIG. 8A, the controller 110 may distinguish the screens 200, 202 from each other. In this case, the controller 110 may sort the screens 200, 202 into the first screen 200 where image information corresponding to content selected by a user is displayed, and the second screen 202 where another image information related to the content displayed on the first screen 200 is displayed, based on an image information display area and/or separation distances between the image information projection device and the screens. And the controller 110 may display image information on each of the screens.

In this case, the controller 110 may determine image information to be displayed on the second screen 202, based on a separation distance 810 between the main body of the image information projection device 100 and the second screen 202. As shown in FIG. 8A, if a separation distance 800 between the image information projection device 100 and the first screen 200 is different from a separation distance 810 between the image information projection device 100 and the second screen 202 by a predetermined level (preset first level) or less, the controller 110 may display additional information related to the contents displayed on the first screen 200, on the second screen 202. For instance, if the content displayed on the first screen 200 is about a film, a profile of a main actor or a director, a synopsis of the film, etc. may be displayed.

The reason is because all image information displayed on the screens 200, 202 is sharable with other users, since a difference between the separation distances between the image information projection device and the first and second screens 200, 202 is not great (less than the preset first level). In this case, as shown in FIG. 8A, the controller 110 recognizes the screens as different screens according to separation distances, and displays image information related to content being currently projected onto one of the screens, on another screen. This may allow not only currently-selected content, but also various information related to the content, to be more transmitted to users.

In this case, if a user changes a position of the second screen 202, the controller 110 may control image information to be continuously output to the second screen 202, by tracing the changed position of the second screen 202. Further, if a separation distance between the second screen 202 and the image information projection device 100 is changed due to the position change, the controller 110 may control another image information to be displayed based on the changed separation distance.

FIGS. 8B and 8C illustrate such an example.

FIG. 8B illustrates that the second screen 202 has further moved towards the image information projection device 100. In this case, the controller 110 may recognize a position change of the second screen 202, and may control image information corresponding to the changed position to be output.

That is, as shown in FIG. 8B, if a separation distance between the image information projection device 100 and the second screen 202 is changed due to a position change of the second screen 202, the controller 110 may display image information corresponding to the changed separation distance 820, on the second screen 202. In this case, the image information 212b corresponding to the changed separation distance 820, may be related to a control screen for controlling an operation of the image information projection device 100 which projects image information onto the first screen 200.

Further, as the separation distance 800 between the first screen 200 and the image information projection device 100 is different from the separation distance 820 between the second screen 202 and the image information projection device 100 by a predetermined level (preset first level) or more, the controller 110 may recognize motions sensed from parts of users' bodies, as inputs corresponding to the first screen 200 and the second screen 202, respectively.

That is, as shown in FIG. 8B, if the first screen 200 and the second screen 202 are distant from each other by more than a predetermined level, a separation distance between a user (first user) in front of the first screen 200 and the image information projection device 100 may be different from a separation distance between a user (second user) in front of the second screen 202 and the image information projection device 100 by more than a predetermined level. If a motion is sensed from a part of the first or second user's body, the controller 110 may determine whether the gesture is performed with respect to the first screen 200 or the second screen 202, based on a difference between the separation distances.

That is, if a separation distance between a part of a user's body of which motion has been sensed and the image information projection device 100 is more similar to the separation distance (the first separation distance 800) between the first screen 200 and the image information projection device 100, the controller 110 may recognize the motion as an input with respect to image information 210 displayed on the first screen 200. On the other hand, if a separation distance between a part of a user's body of which motion has been sensed and the image information projection device 100 is more similar to the separation distance (the second separation distance 820) between the second screen 202 and the image information projection device 100, the controller 110 may recognize the motion as an input with respect to image information 212b displayed on the second screen 202.

The controller 110, which has recognized the user's motion as an input with respect to image information displayed on one of the screens 200, 202, may perform an operation corresponding to the user's gesture. That is, if the user's motion is recognized as a gesture with respect to a control screen for controlling an operation of the image information projection device 100 which projects image information onto the first screen 200 (i.e., the image information 212b displayed on the second screen 202), the controller 110 may recognize a graphic object corresponding to the user's gesture among graphic objects displayed on the control screen 212b. Then, the controller 110 may control an operation of the image information projection device 100 to be controlled.

The controller 110 may recognize a user's input only to a specific screen, according to displayed image information. For instance, as shown in FIG. 8B, if image information displayed on the second screen 202 is a control menu screen, only when a user's gesture is determined as a gesture with respect to the second screen 202, the controller 110 may recognize the user's gesture as an input of the user.

If the second screen 202 has further moved toward the image information projection device 100, the controller 110 may display image information different from that before the second screen 202 has the position change. That is, as shown in FIG. 8C, if the second screen 202 has moved closer to the image information projection device 100, the controller 110 may display another image information instead of the control menu screen shown in FIG. 8B.

For instance, as shown in FIG. 8C, if a distance between the second screen 202 and the image information projection device 100 becomes shorter, the controller 110 may display image information corresponding to the separation distance 830, on the second screen 202. As shown in FIG. 8C, if the second screen 202 moves closer to the image information projection device 100, image information of which content is viewable only by a user (third user) adjacent to the image information projection device 100, may be displayed on the second screen 202. In this case, on the second screen 202, may be displayed image information that the third user does not wish to expose to other users (e.g., other data stored in a storage unit where content selected by the third user (content displayed on the first screen 200) has been stored, or third user's personal information, etc.).

That is, when projecting specific content onto the first screen 200, the third user should select the specific content from the memory 150 or a preset web storage, etc. In this case, if the third user does not wish to expose other data stored in the storage unit together with the content to other users, as shown in FIG. 8C, a list of data stored in the storage unit may be displayed on the second screen 202 closest to the third user, i.e., the second screen 202 having the separation distance 830 which can be checked only by the third user. And the third user may select the specific content from the list of data displayed on the second screen 202, and may project image information corresponding to the specific content onto the first screen 200.

In the aforementioned description, it has been mentioned that the controller 110 of the image information projection device 100 according to an embodiment of the present invention may recognize a sensed new object, as a new screen.

Figure 9:
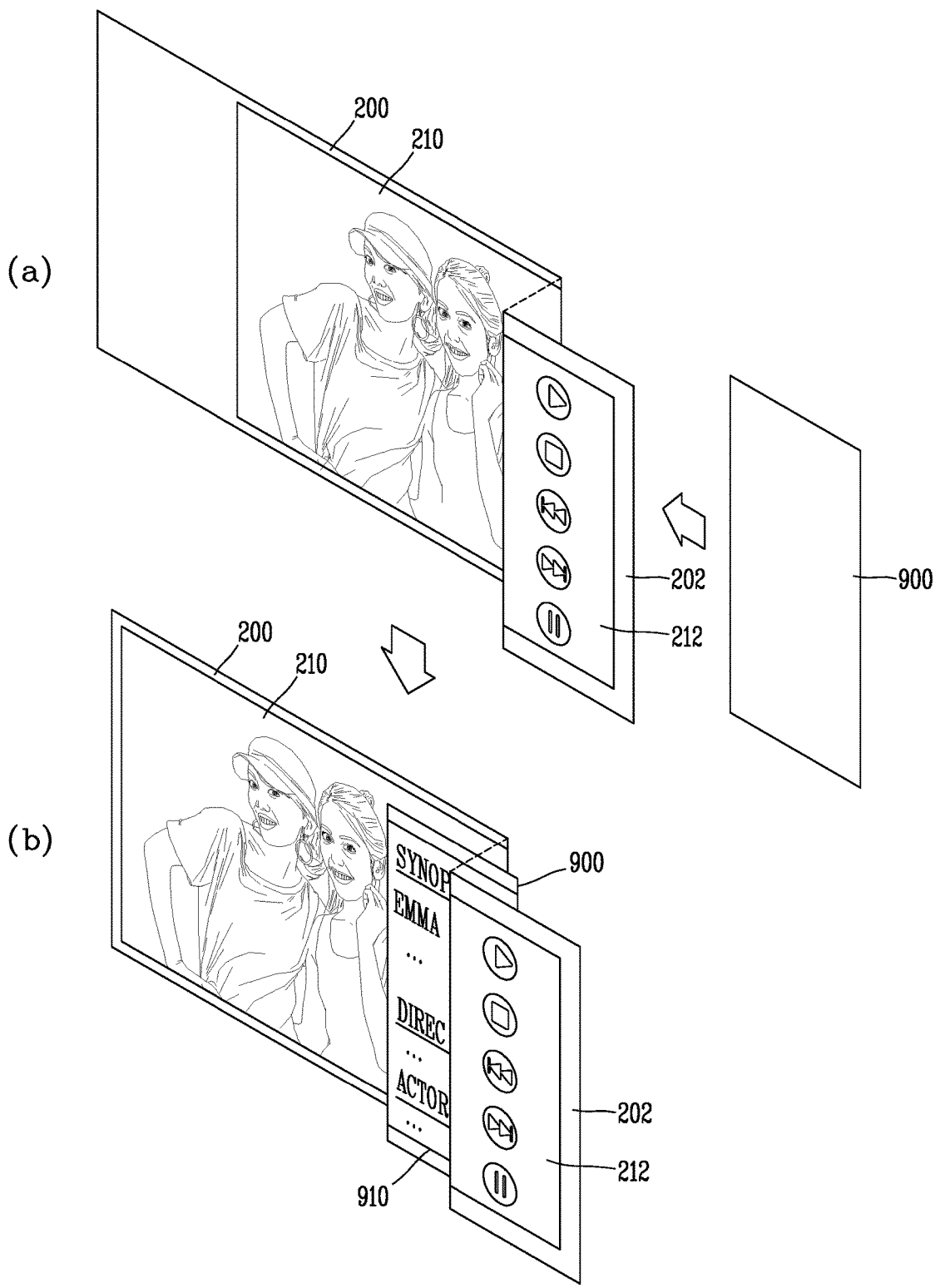
FIG. 9 is a view illustrating an example to use a newly-sensed object as a new screen, by an image information projection device according to an embodiment of the present invention.

FIG. 9 is a view illustrating an example to use a newly-sensed object as a new screen, by the image information projection device according to an embodiment of the present invention.

As shown in FIG. 9A, while image information is being displayed on the first and second screens 200, 202, if a new object 900 occurs, the controller 110 of the image information projection device 100 according to an embodiment of the present invention may sense the new object 900. In this case, the controller 110 may recognize the new object 900 as a new screen based on a preset condition. For instance, a controller 110 may determine whether the new object passes through spaces between the image information projection device 100 and the screens 200, 202, or the new object is recognized as a new screen, based on a preset condition. The preset condition may be whether the sensed new object 900 has a position change or a state change for more than a preset time.

That is, if the new object 900 has a position change, the controller 110 may not recognize the new object 900 as a new screen. Alternatively, based on a shape image of the new object received from an optical sensor (e.g., camera) provided at the sensing unit 130, the controller 110 may determine a state of the new object 900, i.e., whether an image information display area or shape is fixed or not. And the controller 110 may not recognize the new object 900 as a new screen, according to a result of the determination.

If a position and a state of the new object 900 have been fixed for more than a predetermined time, the controller 110 may recognize the new object 900 as a new screen. That is, as shown in FIG. 9A, if the new object 900 is inserted between the first screen 200 and the second screen 202, the controller 110 may recognize the new object as a new screen.

If the new object 900 is recognized as a new screen, the controller 110 may project image information onto the new screen. In this case, the controller 110 may determine image information to be displayed on the new screen 900, based on a distance between the new screen (object 900) and the image information projection device 100. In this case, as shown in FIG. 9B, since a separation distance between the new object 900 and the image information projection device 100 is different from a separation distance between the second screen 202 and the image information projection device 100, image information different from that being currently displayed on the second screen 202 may be displayed on the new object 900. The image information 910 displayed on the new screen 900 is related to content being displayed on the first screen 200.

Thus, as shown in FIG. 9B, the controller 110 may display image information on the new screen 900. More specifically, if content displayed on the first screen 200 is a film, and if image information related to control of the image information projection device 100 which plays the content is displayed on the second screen 202, the controller 110 may project image information including a main actor, a synopsis, or a genre of the content, onto the new screen 900.

As shown in FIG. 9B, if the new object 900 is inserted to be recognized as a new screen, the controller 110 may change a position of image information displayed on the first screen 200, based on the new screen 900. In this case, as shown in FIG. 9B, the controller 110 may move the image information displayed on the first screen 200 to the next by a recognized size of the new screen 900, in order to prevent a blocked state of the image information due to the new screen 900. Alternatively, the controller 110 may change a size of the image information displayed on the first screen 200, instead of changing the position of the image information.

So far, have been explained examples to display different image information according to separation distances between the screens and the image information projection device.

The image information projection device 100 according to an embodiment of the present invention may be independently used, and may be used as a pico projector which projects content desired to be viewed onto a beam project screen in a connected state with various devices including a mobile device such as a smart phone, a tablet PC and a notebook. Further, the image information projection device 100 according to an embodiment of the present invention may be provided at another smart device (i.e., a head mounted display (HMD) device, a mobile terminal, etc.) in a smaller form.

Figure 10A:
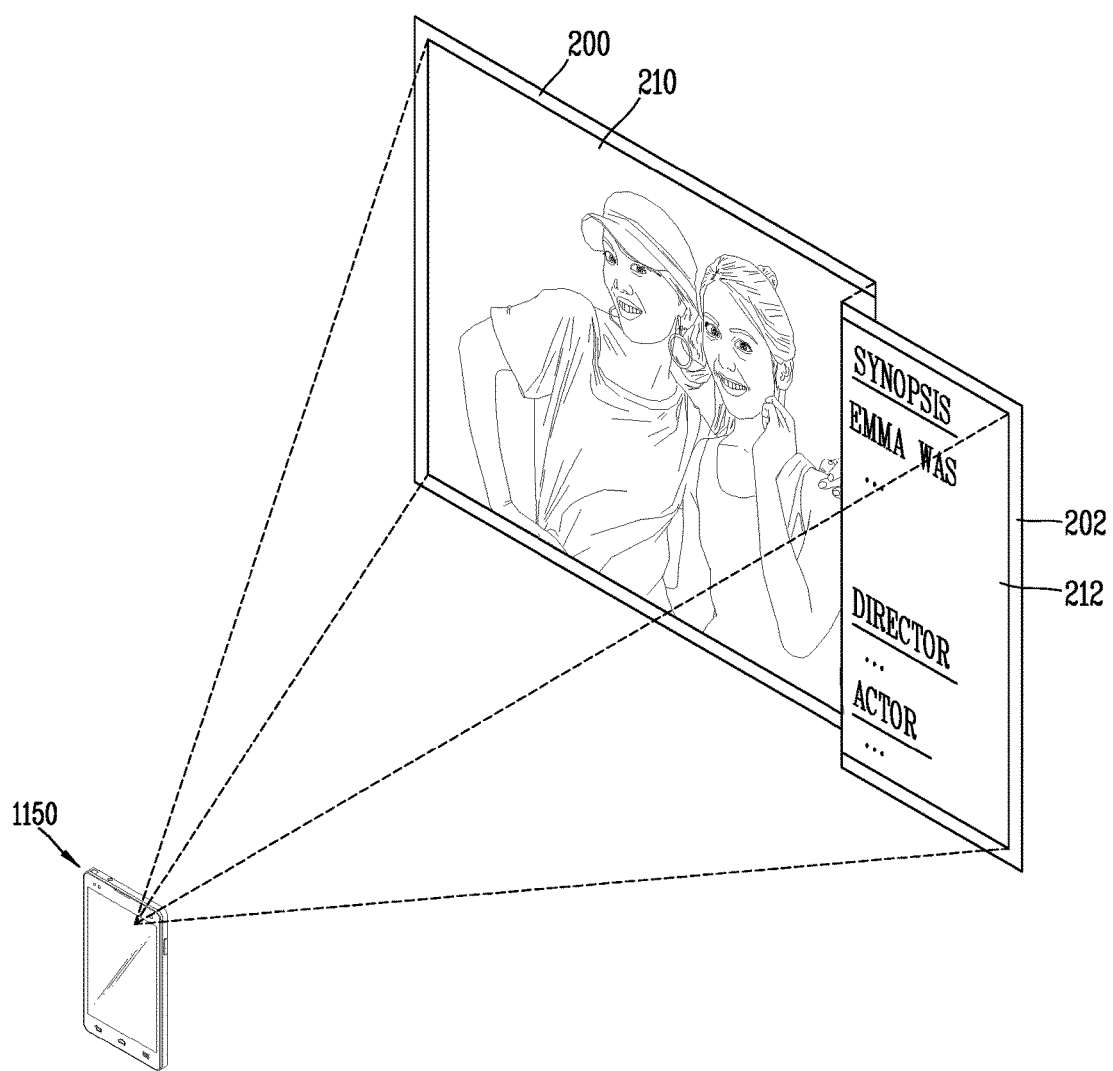
FIG. 10 is a view illustrating an example to utilize a part of a user's body as a new screen, by an image information projection device according to an embodiment of the present invention.
Figure 10B:
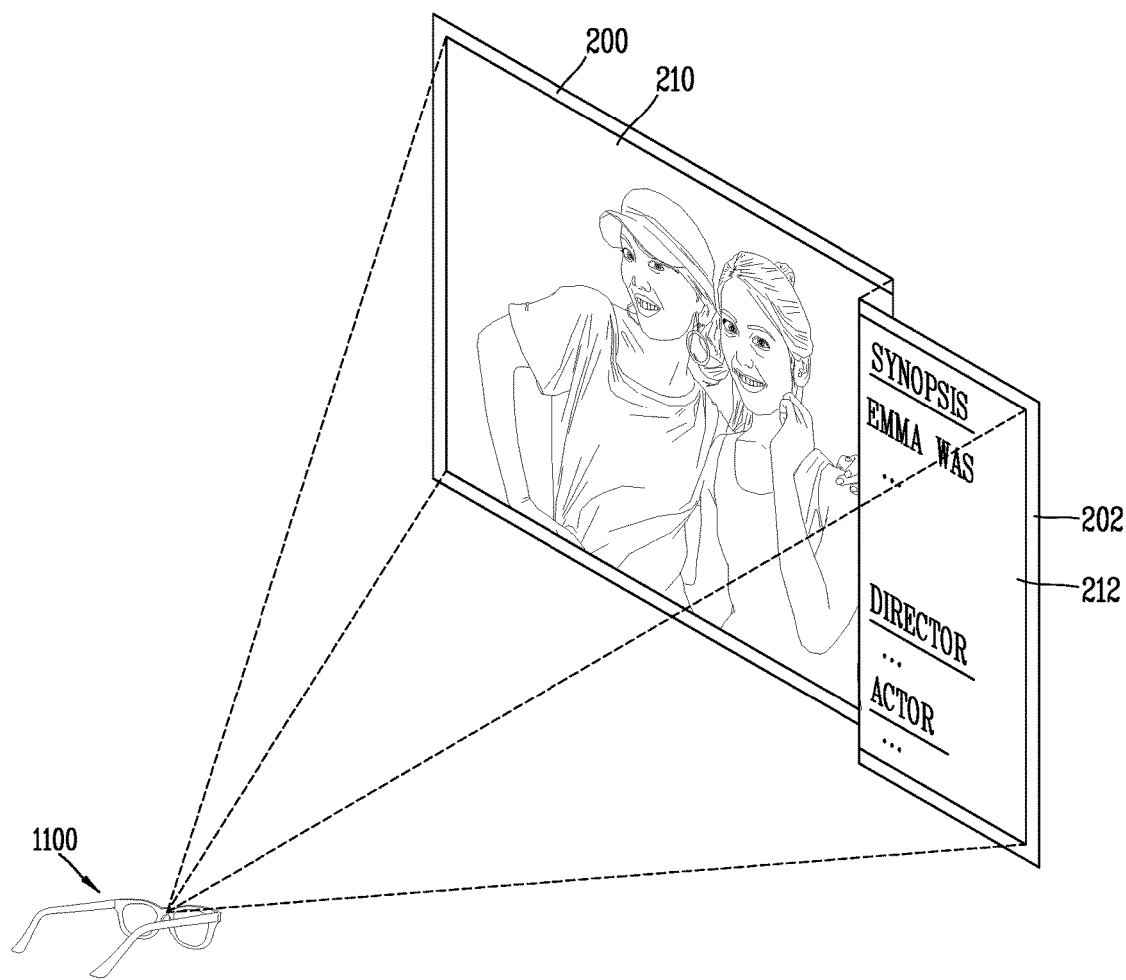

FIGS. 10A and 10B are exemplary views illustrating that the image information projection device according to an embodiment of the present invention is provided at another device.

FIG. 10A illustrates a mobile terminal 1150 having the image information projection device according to an embodiment of the present invention. In this case, the image information projection device 100 according to an embodiment of the present invention may be mounted in the mobile terminal 1150, or may be detachably mounted to the mobile terminal 1150. A controller of the mobile terminal 1150 may serve as the controller 110 of the image information projection device 100 according to an embodiment of the present invention. Alternatively, the controller of the mobile terminal 1150 and the controller 110 of the image information projection device 100 may be separately provided from each other, thereby cooperating with each other. Thus, as shown in FIG. 10A, different image information may be projected onto screens having different separation distances.

FIG. 10B illustrates an HMD device (e.g., a smart glass) 1100 having the image information projection device 100 according to an embodiment of the present invention. In this case, the image information projection device 100 according to an embodiment of the present invention may be mounted in the HMD device, or may be detachably mounted to the HMD device. A controller of the HMD device 1100 may serve as the controller 110 of the image information projection device 100 according to an embodiment of the present invention. Alternatively, the controller of the HMD device 1100 and the controller 110 of the image information projection device 100 may be separately provided from each other, thereby cooperating with each other. Thus, as shown in FIG. 10B, different image information may be projected onto screens having different separation distances.

Figure 11:
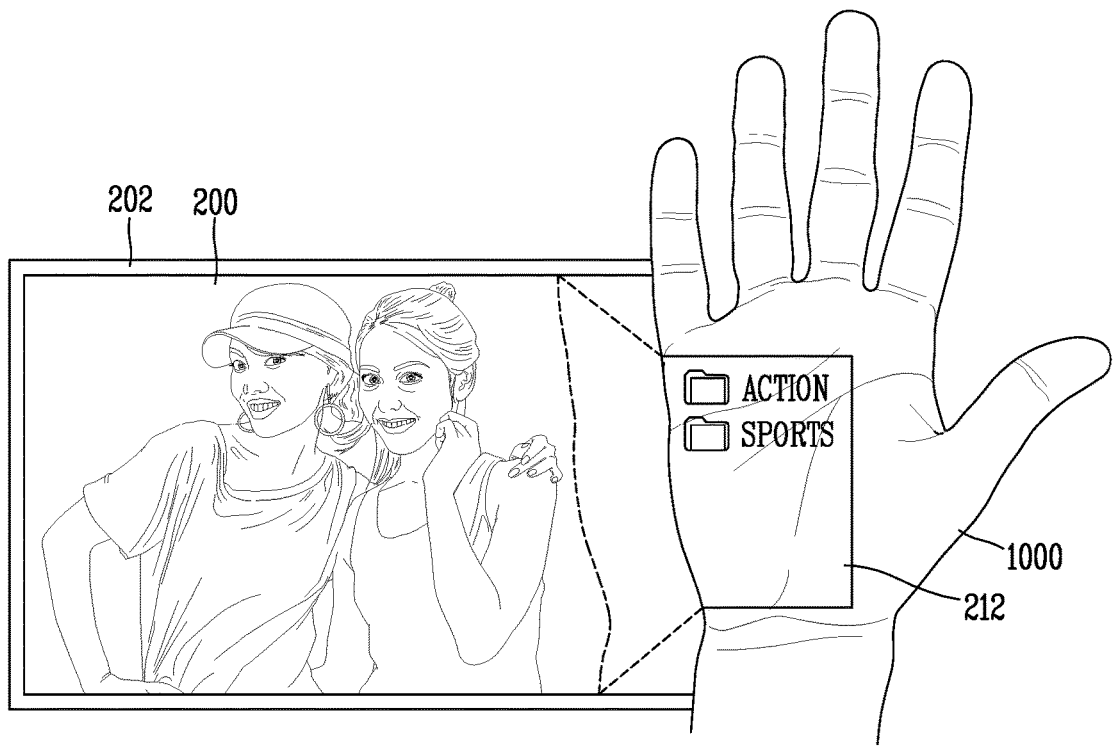
FIG. 11 is a view illustrating an example that an image information projection device according to an embodiment of the present invention is provided at another device.

FIG. 11 is a view illustrating an example that the image information projection device according to an embodiment of the present invention utilizes a part of a user's body, as a screen.

For instance, the HMD device 1100 having the image information projection device 100 according to an embodiment of the present invention shown in FIG. 10B may project image information as shown in FIG. 11. In the following description, it is assumed that the controller of the HMD device 1100 serves as the controller 110 of the image information projection device 100 according to an embodiment of the present invention. In this case, the controller 110 of the HMD device 1100 may recognize a part of a user's body as a screen having a different separation distance. As shown in FIG. 11, image information corresponding to content selected by a user may be displayed on a first screen 200, and information corresponding to a separation distance between the HMD device 1100 and a part 1000 of a user's body, i.e., information on other data together stored in a storage unit where the content has been stored, etc. may be displayed on the part 1000 of the user's body. In this case, as shown in FIG. 11, information that the user does not wish to expose to other users may be displayed on the part 1000 of the user's body. The reason is because the separation distance between the HMD device 1100 and the part 1000 of the user's body may be very short (less than a preset value) when the user wears the HMD device 1100.

As aforementioned, it is possible that the image information projection device 100 according to an embodiment of the present invention is connected to surrounding equipment to project image information stored in the surrounding equipment. The surrounding equipment may be various (e.g., a personal computer, a smart phone, etc.). The controller 110 may serve as a monitor which displays image information stored in the PC or the smart phone, etc. by using screens.

In this case, the controller 110 may recognize the screens having different separation distances as different monitors. That is, if the image information projection device is connected to a PC, a smart phone or the like, the controller 110 may recognize the screens having different separation distances as different monitors, thereby providing a function of a dual monitor provided from the PC or the smart phone, etc. In this case, the image information projection device 100 according to an embodiment of the present invention may display image information including a different user interface, on each of the screens.

Various embodiments may be implemented using a machine-readable medium having instructions stored thereon for execution by a processor to perform various methods presented herein. Examples of possible machine-readable mediums include HDD(Hard Disk Drive), SSD (Solid State Disk), SDD(Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 110 of the image information projection device.

The invention claimed is:

1. An image information projection device comprising:
a main body;
a projector configured to project image information onto at least two screens having different separation distances from the main body;
a sensor configured to sense separation distances between the at least two screens and the main body; and
a controller coupled to the projector and the sensor, the controller configured to control the projector such that different image information is projected onto the at least two screens based on the separation distances between the at least two screens and the main body,
wherein the controller projects image information corresponding to content selected by a user onto a first screen among the at least two screens, and projects image information related to the content onto a second screen among the at least two screens,
wherein the controller is further configured to:
determine the image information display areas on the at least two screens, based on points where the separation distances are changed on image information display regions on the at least two screens; and
sort the at least two screens into the first screen and the second screen based on at least one of the separation distances and image information display areas on the at least two screens, and
wherein the controller determines a screen having a largest image information display area as the first screen.

2. The device of claim 1, wherein the controller controls focal distances of the image information displayed on the at least two screens, based on the separation distances between the at least two screens and the main body.

3. The device of claim 1, wherein the controller differently sets resolutions of the at least two screens.

4. The device of claim 3, wherein the controller determines the resolutions of the at least two screens, based on the separation distances between the at least two screens and the main body.

5. The device of claim 1, wherein if the second screen has a position change, the controller senses the changed position of the second screen, and displays the image information related to the content, on the position-changed second screen.

6. The device of claim 5, wherein the controller displays image information different from that before the second screen has the position change, based on a distance between the position-changed second screen and the main body.

7. The device of claim 1, wherein the controller senses a user's gesture from a motion of a part of the user's body, and recognizes the sensed gesture as a user's input with respect to image information projected onto one of the at least two screens, based on a distance between the part of the user's body and the main body.

8. The device of claim 7, wherein the controller recognizes only a user's gesture with respect to a specific screen as the user's input, based on image information displayed on the at least two screens.

9. The device of claim 1, wherein if an object is sensed between the at least two screens and the main body, the controller recognizes the object as a new screen, based on a sensing time of the object.

10. The device of claim 9, wherein if a position and a state of the object are fixed for more than a predetermined time, the controller recognizes the object as a new screen.

11. The device of claim 9, wherein if the object is recognized as a new screen, the controller projects, onto the new screen, image information different from that projected onto the first and second screens.

12. The device of claim 11, wherein the image information projected onto the new screen is related to the content having not projected onto the second screen.

13. The device of claim 1, wherein the sensor senses the separation distances between the at least two screens and the main body, using at least one of an infrared ray sensor, an ultrasonic sensor, a laser sensor and a light sensor.

14. The device of claim 1, wherein the at least two screens are arranged in at least two, in parallel in a horizontal direction or in a vertical direction.

15. The device of claim 1, wherein the image information projected onto the second screen includes at least one of a control menu of an application which plays the content projected onto the first screen, and additional information related to the content.

16. The device of claim 1, wherein when the image information projection device is connected to a personal computer (PC) body or a smart phone, the controller performs a dual monitor function by recognizing the first and second screens as different monitors, based on the separation distances.

17. The device of claim 1, wherein the image information projection device is mounted to a head mounted display (HMD) device or a mobile terminal.

18. A method for controlling an image information projection device, the method including:

sensing, via a sensor, separation distances between a main body of the image information projection device and at least two screens having different separation distances from the main body;

sorting the at least two screens into a first screen onto which image information corresponding to content selected by a user is projected, and a second screen onto which image information related to the content is projected; and projecting, via a projector, the image information corresponding to the content, and the image information related to the content, onto the sorted screens, wherein the sorting the screens further comprises:

determining, via a controller, the image information display areas on the at least two screens, based on points where the separation distances are changed on image information display regions on the at least two screens; and sorting the at least two screens into the first screen and the second screen based on at least one of the separation distances and image information display areas on the at least two screens, and wherein a screen having the largest image information display area is determined as the first screen.

* * * * *